United States Patent
Kang

(10) Patent No.: US 6,749,531 B2
(45) Date of Patent: Jun. 15, 2004

(54) MULTI-SPEED GEAR SYSTEM FOR A CHAIN TRANSMISSION DEVICE OF A BICYCLE

(75) Inventor: In Hwan Kang, Montrose, CA (US)

(73) Assignee: Novastar Technology, Inc., Los Angeles, CA (US)

( * ) Notice: Subject to any disclaimer, the term of this patent is extended or adjusted under 35 U.S.C. 154(b) by 0 days.

(21) Appl. No.: 10/271,091

(22) Filed: Oct. 15, 2002

(65) Prior Publication Data

US 2004/0072640 A1 Apr. 15, 2004

(51) Int. Cl.[7] .................................................. F16H 9/10
(52) U.S. Cl. ........................................ 474/160; 474/47
(58) Field of Search ................................ 474/160, 47

(56) References Cited

U.S. PATENT DOCUMENTS

| | | | | |
|---|---|---|---|---|
| 3,956,944 A | * | 5/1976 | Tompkins | 474/50 |
| 3,995,508 A | * | 12/1976 | Newell | 474/50 |
| 4,493,678 A | * | 1/1985 | Husted | 474/164 |
| 4,498,351 A | * | 2/1985 | Ahoor | 474/47 |
| 4,772,250 A | * | 9/1988 | Kovar et al. | 474/47 |
| 5,104,357 A | * | 4/1992 | Leonard et al. | 474/49 |
| 6,332,852 B1 | * | 12/2001 | Allard | 474/53 |
| 2002/0042314 A1 | * | 4/2002 | Mimura | 474/56 |

FOREIGN PATENT DOCUMENTS

DE   3541182 A1 * 5/1987   ............ B62M/9/08

* cited by examiner

Primary Examiner—David A. Bucci
Assistant Examiner—Bradley J. Van Pelt
(74) Attorney, Agent, or Firm—Park & Sutton LLP; John K. Park

(57) ABSTRACT

A multi-speed gear system for a chain transmission device of a bicycle is provided. The system includes a disc having a front plate, a rear plate, and a plurality of tooth series concentrically arranged in the disc and a tooth series selector. Each of the tooth series has a plurality of tooth blocks; the front plate of the disc has a plurality of tooth holes; and the rear plate of the disc has a plurality of rear holes. Each of the tooth blocks is either pushed into a corresponding one of the tooth holes or protrude out of the front plate and the tooth series selector selects one of the tooth series to change speed and makes the tooth blocks of the selected tooth series protrude out of the front plate.

26 Claims, 12 Drawing Sheets

MULTI-SPEED GEAR SYSTEM FOR A CHAIN TRANSMISSION DEVICE OF A BICYCLE

BACKGROUND OF THE INVENTION

The present invention relates to a multi-speed gear system for a chain transmission device. More particularly, the invention relates to a simpler and lighter multi-speed gear system for a chain transmission device for a multi-speed bicycle.

Many bicycles include multi-speed transmissions to enhance their operation over different types of terrains. Existing bicycle transmissions are generally derailleur type manually controlled by a cable connected to a shift lever. Moving the shift lever changes the cable tension and moves the derailleur and a drive chain from one sprocket to another sprocket. Since the chain moves between sprocket wheels, the plane in which a driving sprocket that is connected to the pedals and the plane in which a driven sprocket that is connected to the rear wheel of the bicycle should be close if not identical. In addition, the diameters of adjacent sprockets cannot be much different because an abrupt reduction or increase of the diameter may cause the chain fail to be wound around the destination sprocket. Owing to these prior art multi-speed speed gear system for a bicycle includes many sprockets for both the driving sprocket and the driven sprocket sides. For example, for a speed change ratio from about 1:1 to 3:1, three driving sprockets and 9 driven sprockets are used, and there are 27 shift steps. Thus the speed change gained by one shift step is not appreciable. In order to get a comfortable feeling, the bicycle rider should repeat several steps of shifting. Also the plurality of sprockets increase the weight and cost of the bicycle.

SUMMARY OF THE INVENTION

The present invention contrives to solve the disadvantages of prior art.

Therefore, an object of the invention is to provide a simpler and lighter multi-speed gear system for a multi-speed bicycle.

Another object of the invention is to provide a multi-speed gear system that can provide a bigger speed change for a shift step.

Still another object of the invention is to provide a multi-speed gear system that can change speed in a single plane.

To achieve the above-described objects, the invention provides a multi-speed gear system for a chain transmission device of a bicycle that includes a disc having a front plate, a rear plate, and a plurality of tooth series concentrically arranged in the disc, and a tooth series selector. The front plate and the rear plate are spaced apart by a predetermined distance, and each of the tooth series has a plurality of tooth blocks. The front plate of the disc has a plurality of tooth holes, and the rear plate of the disc has a plurality of rear holes. Each of the tooth blocks is either pushed into a corresponding one of the tooth holes or protrudes out of the front plate, and in order to change speed, the tooth series selector selects one of the tooth series and makes the tooth blocks of the selected tooth series protrude out of the front plate. The front plate has apertures between the tooth holes and the rear plate has apertures between the rear holes to reduce the weight of the disc.

The tooth series selector makes the tooth blocks of the next radially outward tooth series protrude out of the front plate when the ratio of speed change becomes higher, and makes the tooth blocks of the next radially inward tooth series be pushed into the tooth holes when the ratio of speed change becomes lower.

The multi-speed gear system may further comprise a sprocket wheel and the diameter of the sprocket wheel is smaller than the diameter of the radially innermost tooth series.

Preferably, the number of the tooth series is five, and the ratio of speed change is in a range between about and about 1:1 and about 3.2:1. Also, preferably, the number of tooth blocks of each tooth series is about seven.

The tooth blocks of the tooth series are arranged so that the line connecting the center of one of the tooth blocks of one of the tooth series and the center of the corresponding tooth block of the adjacent tooth series is a curve. Preferably, the curve is spiral.

Each of the tooth blocks has a body, two teeth that protrude from the body, a projection that protrudes from the body, a guide portion that protrudes from the body between the teeth and the projection, a recess provided in the projection and the guide portion, a slot provided in the recess, a stop spring and a snap spring.

The stop spring and the snap spring are received in the recess. The stop spring protrudes out of the tooth block through the slot. When one of the teeth is pushed, the teeth are pushed into the tooth hole of the front plate of the disc, the snap spring snaps the tooth block in a position in which the teeth are pushed into the disc, the guide portion abuts the rear plate of the disc limiting further movement of the tooth block, and the projection protrudes out of the rear plate of the disc. When the projection is pushed into the rear hole of the rear plate of the disc, the snap spring snaps the tooth block in a position in which the projection is pushed into the disc, the stop spring abuts the front plate of the disc limiting further movement of the tooth block, the teeth protrude out of the front plate of the disc, and the guide portion contacts the tooth hole.

The tooth block further includes a hole in the recess to disassemble the tooth block from the disc.

The tooth series selector has a U-shaped selector body, an upper arm, a lower arm, and a pin connecting the upper arm and the lower arm. The selector body has a top wall, a bottom wall, and a side wall connecting the top wall and the bottom wall. The pin is pivotally attached to the side wall. The top wall has a plurality of pivoting blocks and the bottom wall has a polarity of pivoting blocks. The disc rotates between the top wall and the bottom wall. Each of the pivoting blocks is biased outside of the tooth series selector by a spring. The upper arm selectively push the pivoting blocks into the space between the top wall and the front plate of the disc and the selected pivoting block pushes the teeth of the tooth blocks of the selected tooth series into the tooth holes of the front plate. The lower arm selectively push the pivoting blocks into the space between the bottom wall and the rear plate of the disc and the selected pivoting block pushes the projections of the tooth blocks of the selected tooth series into the rear holes of the rear plate.

The upper arm and the lower arm are biased toward the original position by a return spring. A cable is attached to the lower arm, and the upper arm and the lower arm are rotated from the original position by pulling the cable. The upper arm has steps so that the upper arm pushes all of the pivoting blocks of the top wall at the original position and gradually releases more pivoting blocks starting from the radially innermost pivoting block as the upper arm is rotated further from the original position, and the lower arm has steps so that the lower arm releases all of the pivoting blocks of the bottom wall at the original position and gradually pushes more pivoting blocks starting from the radially innermost pivoting block as the lower arm is rotated further from the original position.

Each of the pivoting blocks includes two arc-shaped walls, two side walls making a predetermined angle, a flat wall and two curved walls connecting the flat wall and the two side walls. The two side walls, the two curved walls and the flat wall connect the two arc-shaped walls. The two side walls are symmetrically positioned and the two curved walls are symmetrically positioned. A first through hole is provided between one of the curved walls and one of the side walls, and wherein the tooth series selector further has a shaft that is received in the first through hole. Preferably, the predetermined angle is in the range between about 110 and about 120 degrees. Also, preferably, the two side walls are concave.

The pivoting block further includes a second through hole, and the tooth series selector further includes a rod received in the second through hole. The size of the second through hole is substantially larger than the size of the rod, and the rod limits outward rotation of the pivoting block when the pivoting block is released.

The pivoting block further includes a recess formed in the curved wall and the side wall, and the spring biasing the pivoting block outward is received in the recess and wound around the shaft of the tooth series selector.

The multi-speed gear system may further comprise a speed selector that is connected to the tooth series selector with the cable.

When the multi-speed gear system for a chain transmission device is used for a bicycle having a driving sprocket wheel driven by pedals of the bicycle, a driven sprocket wheel attached to a rear wheel of the bicycle, one or more tension sprocket wheels, and a chain wound around the sprocket wheels, the disc of the multi-speed gear system becomes the driving sprocket wheel.

The advantages of the present invention are numerous in that: (1) the multi-speed gear system includes only one sprocket wheel, thus is lighter and simpler; (2) the chain moves in a single plane for any shift step; and (3) shifting may be performed without driving the rear wheel of the bicycle.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
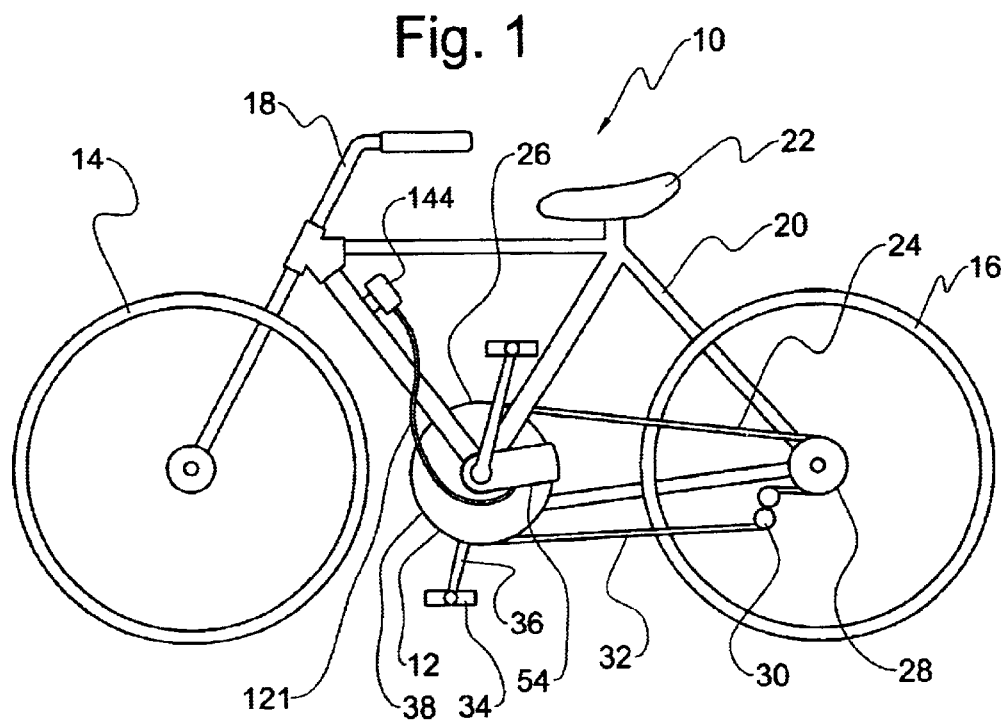
FIG. 1 is an elevational view of a bicycle on which the multi-speed gear system of the present invention is installed.

FIG. 1 shows a bicycle 10 on which the multi-speed gear system 12 of the present invention is installed. Generally, the bicycle 10 includes a front wheel 14, a rear wheel 16, a handle 18, a frame 20, a seat 22, and a chain transmission device 24. The chain transmission device 24 includes a driving sprocket wheel 26, a driven sprocket wheel 28, two tensioning wheels 30, and a chain 32 wound around the wheels 26, 28 and 30. Pedals 34 are connected to the driving sprocket wheel 26 through pedal arms 36. The multi-speed gear system 12 is related to the chain transmission device 24, and more specifically to the driving sprocket wheel 26.

As shown in FIGS. 1–4, the multi-speed gear system 12 includes a disc 38 having a front plate 40, a rear plate 42, and a plurality of tooth series 44, 46, 48, 50 and 52,concentrically arranged in the disc 38, and a tooth series selector 54. The disc 38 corresponds to the driving sprocket wheel 26.

Figure 2:
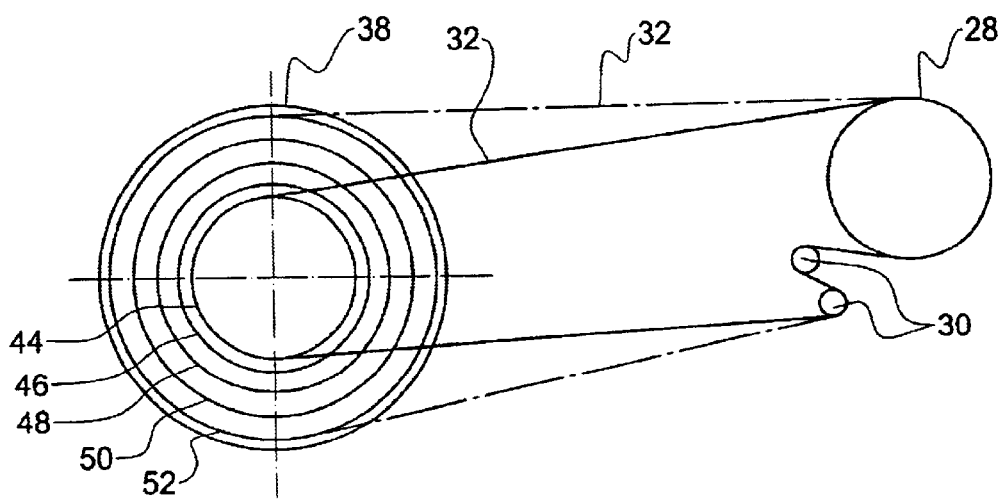
FIG. 2 is a schematic view showing a chain transmission device that employs the multi-speed gear system.

FIG. 2 shows how the chain 32 moves between the tooth series 44, 46, 48, 50 and 52 and shifts up or down the speed change steps. Since the tooth series 44, 46, 48, 50 and 52 are positioned in one plane, the chain 32 moves only in the plane. The solid line indicates that the chain 32 is wound around the innermost tooth series 44, and the imaginary line indicates that the chain 32 is wound around the outermost tooth series 52. The tension rollers 30 absorb the difference of the length of the chain 32 between the disc 38 and the driven sprocket wheel 28.

Figure 11:
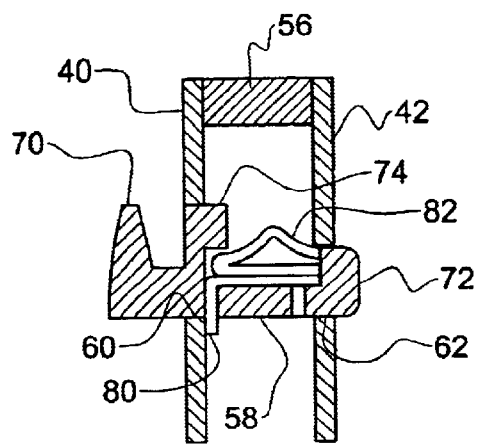
FIG. 11 is a cross-sectional view taken along the line 11—11 in FIG. 3.
Figure 12:
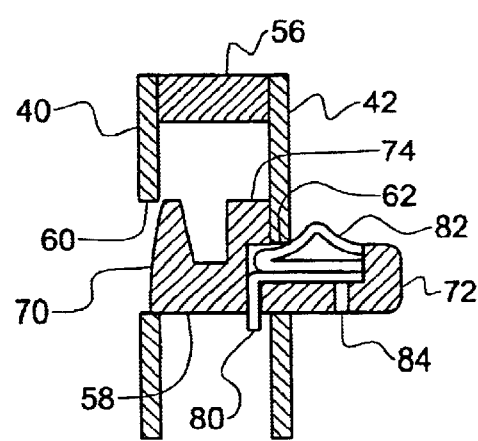
FIG. 12 is a view similar to FIG. 11 but different in that the tooth block is pushed into the hole of the front plate of the disc.

As shown in FIGS. 11 and 12, the front plate 40 and the rear plate 42 are spaced apart by a predetermined distance with a ring 56 having a rectangular cross section.

Figure 3:
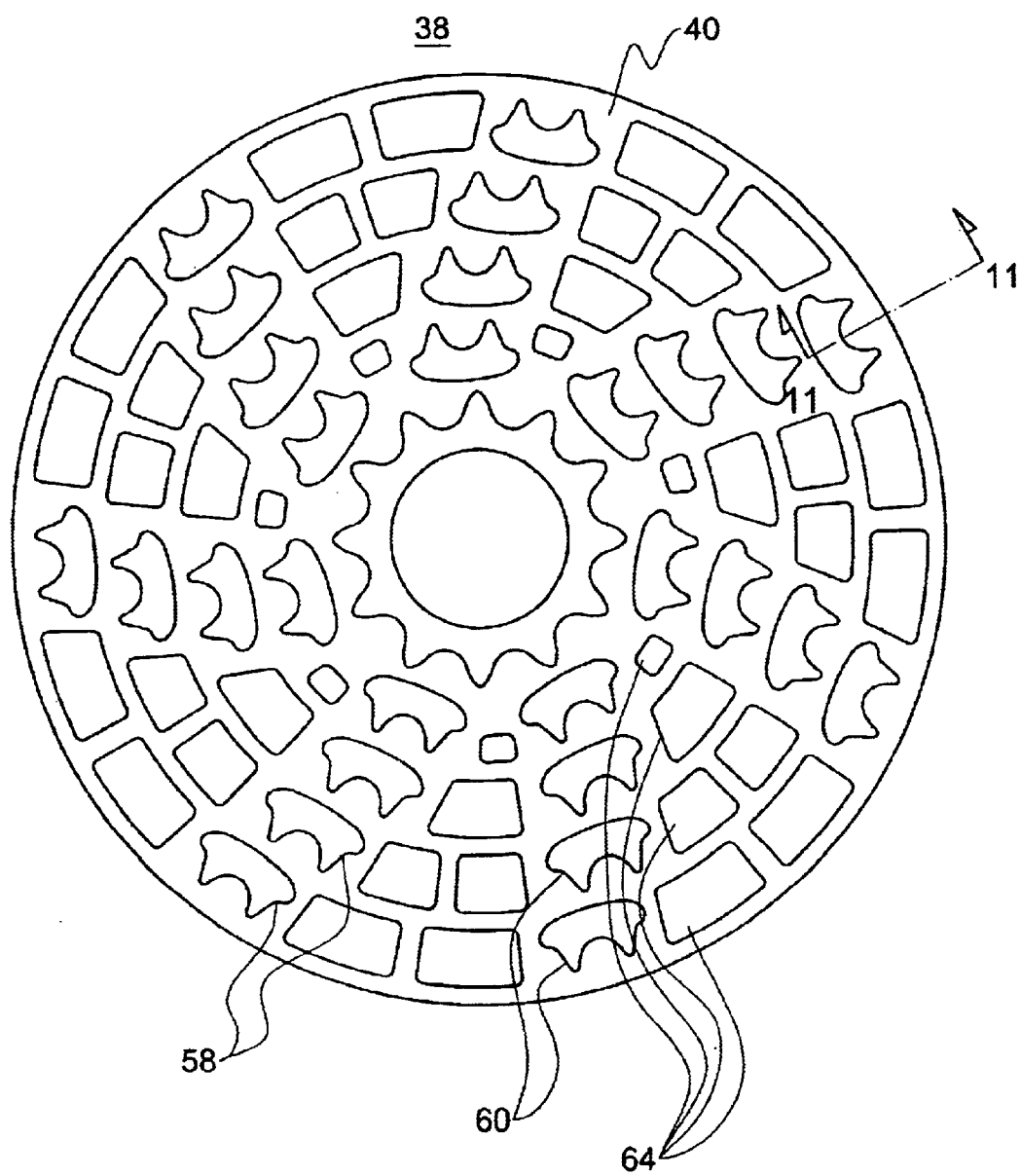
FIG. 3 is a front elevational view of a disc of the multi-speed gear system.
Figure 4:
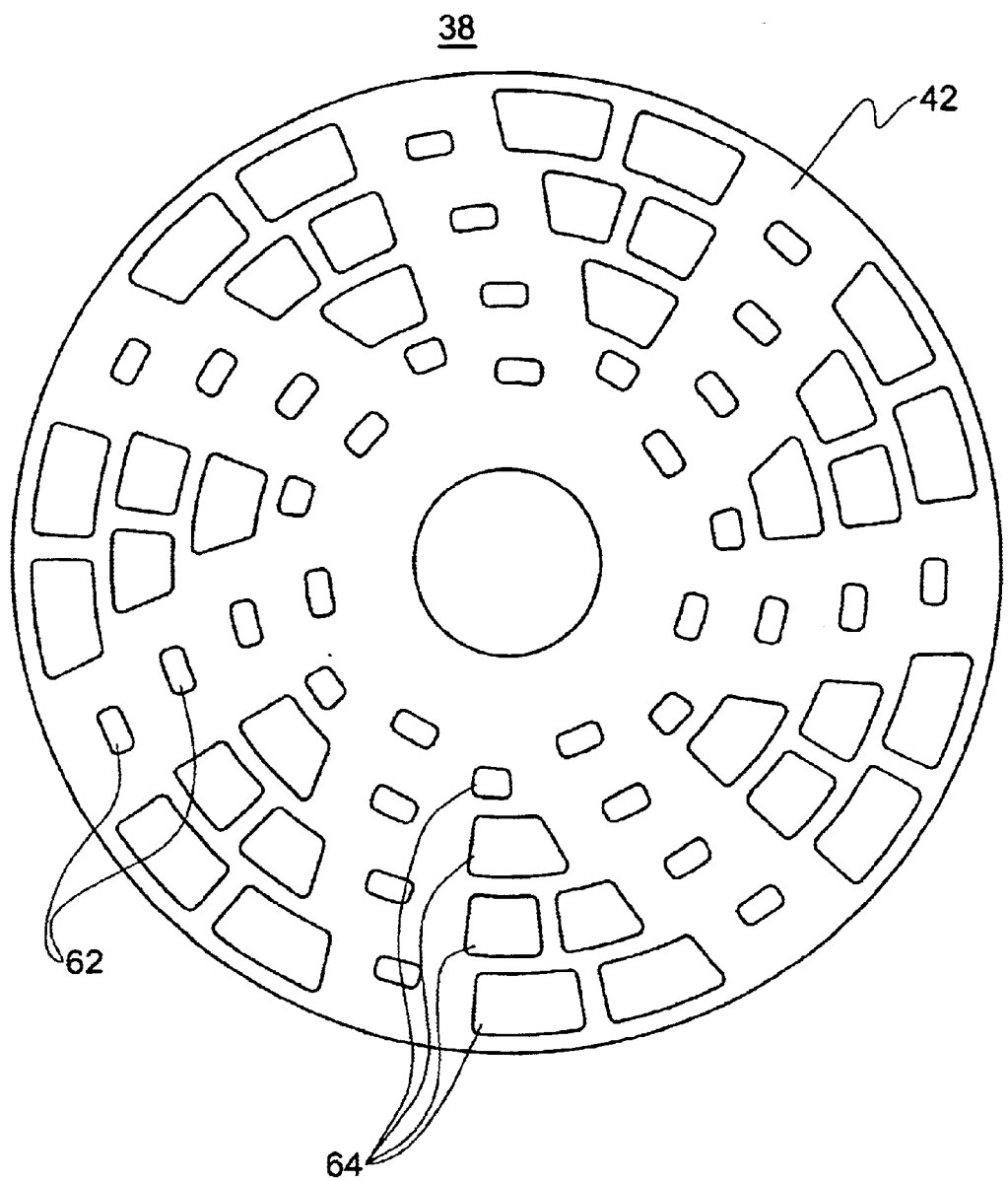
FIG. 4 is a rear elevational view of the disc.

As shown in FIGS. 3 and 4, each of the tooth series 44, 46, 48, 50 and 52 has a plurality of tooth blocks 58. The front plate 40 of the disc 38 has a plurality of tooth holes 60, and the rear plate 42 of the disc 38 has a plurality of rear holes 62. The front plate 40 has apertures 64 between the tooth holes 60 and the rear plate 42 has apertures 64 between the rear holes 62 to reduce the weight of the disc 38.

The shape of the tooth hole 60 corresponds to the shape of the tooth block 58 at the front plate 40, and the shape of the rear hole 62 corresponds to the shape of the tooth block 58 at the rear plate 42. The tooth block 58 is explained later with reference to FIGS. 7–16. Each of the tooth blocks 58 is either pushed into a corresponding one of the tooth holes 60 or protrudes out of the front plate 40. The tooth series selector 54 selects one of the tooth series 44, 46, 48, 50 and 52 in order to change speed and makes the tooth blocks 58 of the selected tooth series protrude out of the front plate 40. The detailed operation of the tooth series selector 54 is explained later referring FIGS. 17–33.

Figure 5:
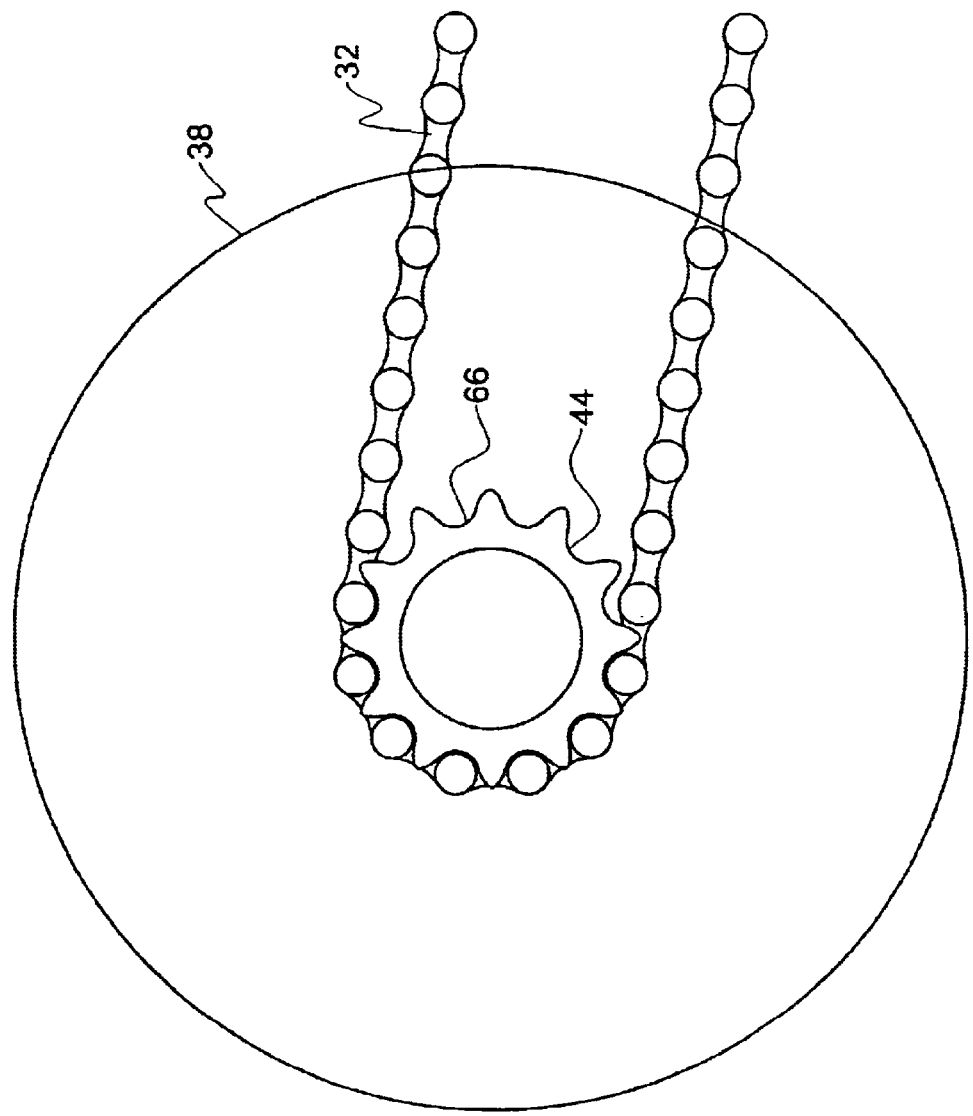
FIG. 5 is a schematic view showing that a chain is wound on a sprocket wheel on the disc, and that the multi-speed gear system is set to the lowest speed change ratio.
Figure 6:
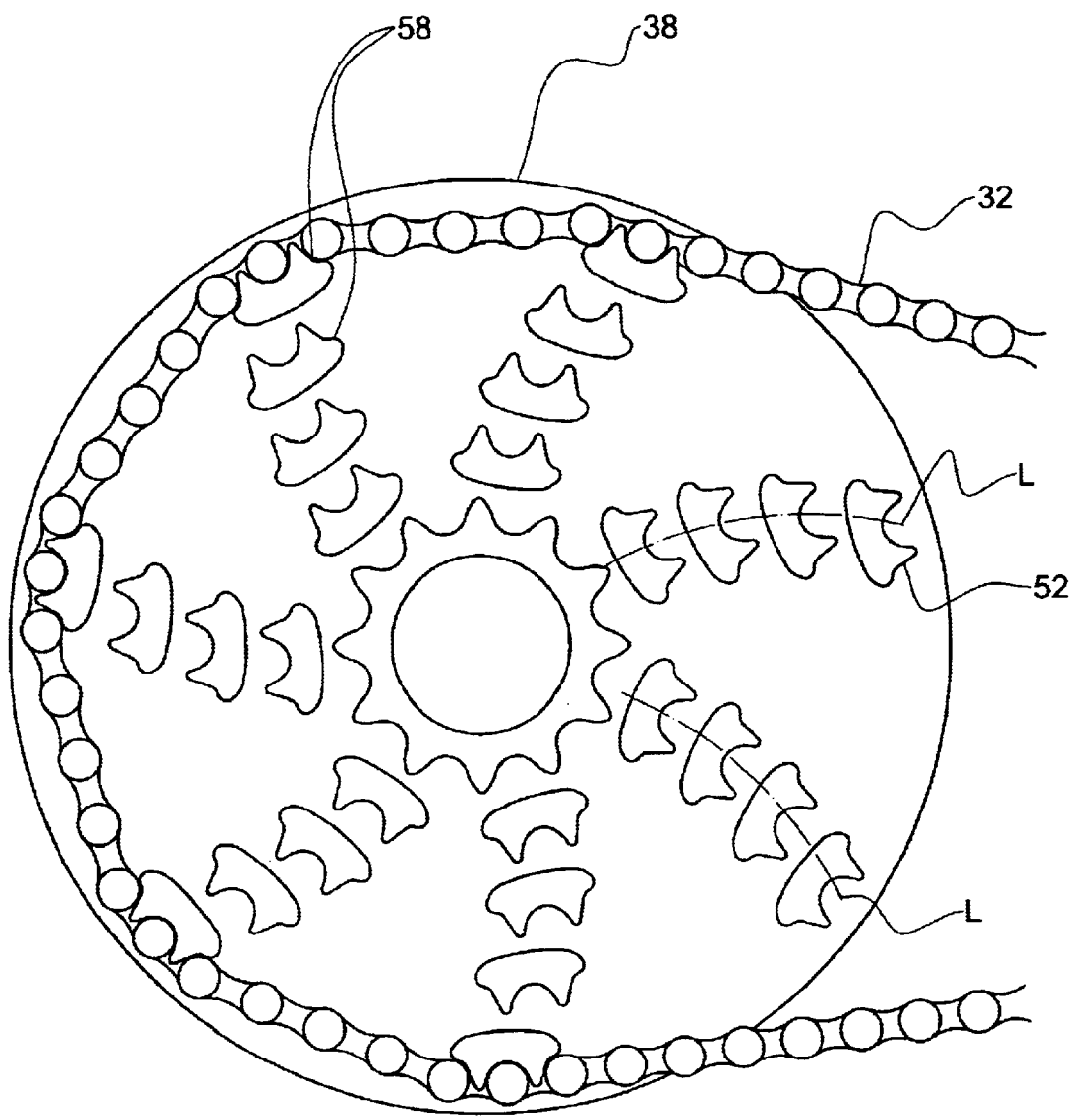
FIG. 6 is a schematic view showing that the chain is wound on the outermost tooth series of the disc, and that the multi-speed gear system is set to the highest speed change ratio.
Figure 7:
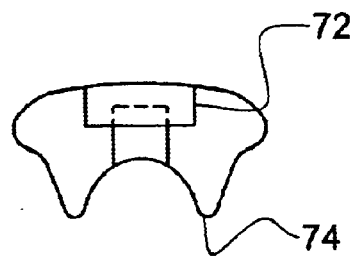
FIG. 7 is a plan view of a tooth block.
Figure 8:
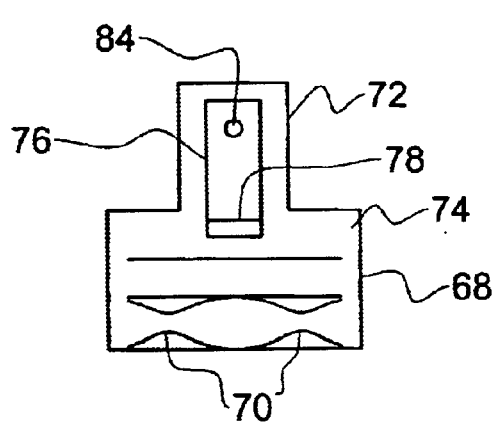
FIG. 8 is a front elevational view of the tooth block.
Figure 9:
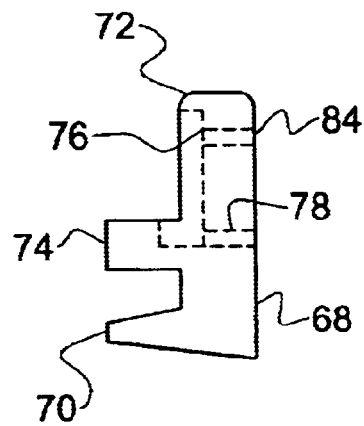
FIG. 9 is a side elevational view of the tooth block.
Figure 10:
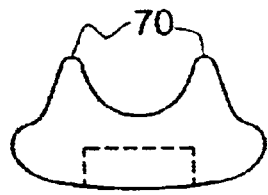
FIG. 10 is a bottom view of the tooth block.

FIGS. 5 and 6 show how the chain 32 is wound on the innermost tooth series 44, and on the outermost tooth series 52, respectively. Preferably, the innermost tooth series 44 is replaced by a sprocket wheel 66. And then the tooth series 46 becomes the innermost tooth series that has the movable tooth blocks 58. As the speed change ratio becomes higher, the tooth blocks 58 of more tooth series are protruded radially outward and the chain 32 is moved radially outward. That is, the tooth series selector 54 makes the tooth blocks 58 of the next radially outward tooth series protrude out of the front plate 40 when the ratio of speed change becomes higher, and makes the tooth blocks 58 of the next radially inward tooth series be pushed into the tooth holes 60 when the 1ratio of speed change becomes lower.

For a standard size of the disc 38 as the driving sprocket wheel 26, the ratio of speed change is in a range between about and about 1:1 and about 3.2:1 with the five tooth series 44, 46, 48, 50 and 52. Also each of the tooth series has seven tooth blocks 58.

As shown in FIG. 6, the tooth blocks 58 of the tooth series 44, 46, 48, 50 and 52 are arranged so that the line L connecting the center of one of the tooth blocks 58 of one of the tooth series and the center of the 2corresponding tooth block 58 of the adjacent tooth series is a curve. This arrangement provides smooth shifting of the multi-speed gear system 12. Preferably, the curve is spiral.

FIGS. 7–10 show the tooth block 58. The tooth block 58 has a body 68, two teeth 70 that protrude from the body 68, a projection 72 that protrudes from the body 68, a guide portion 74 that protrudes from the body 68 between the teeth 70 and the projection 72, a recess 76 provided in the projection 72 and the guide portion 74, a slot 78 provided in the recess 76, a stop spring 80 and a snap spring 82. The stop spring 80 and the snap spring 82 are received in the recess 76. The stop spring 80 protrudes out of the tooth block 58 through the slot 78. The tooth block 58 further includes a hole 84 in the recess 76 to disassemble the tooth block 58 from the disc 38.

As shown in FIGS. 11 and 12, when one of the teeth 70 is pushed, the teeth 70 are pushed into the tooth hole 60 of the front plate 40 of the disc 38, the snap spring 82 snaps the tooth block 58 in a position in which the teeth 70 are pushed into the disc 38, the guide portion 74 abuts the rear plate 42 of the disc 38 limiting further movement of the tooth block 58, and the projection 72 protrudes out of the rear plate 42 of the disc 38.

When the projection 72 is pushed into the rear hole 62 of the rear plate 42 of the disc 38, the snap spring 82 snaps the tooth block 58 in a position in which the projection 72 is pushed into the disc 38, the stop spring 80 abuts the front plate 40 of the disc 38 limiting further movement of the tooth block 58, the teeth 70 protrude out of the front plate 40 of the disc 38, and the guide portion 74 contacts the tooth hole 60.

Figure 13:
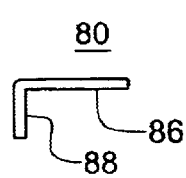
FIG. 13 is an elevational view of a stop spring.
Figure 14:
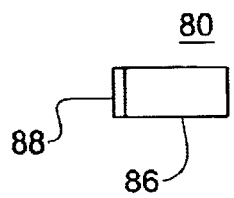
FIG. 14 is a plan view of the stop spring.

FIGS. 13 and 14 show the stop spring 80. The stop spring 80 is L shaped, and includes a first flat portion 86 and a second flat portion 88 that is perpendicular to the first flat portion 86. The second flat portion 88 protrudes out of the tooth block 58 through the slot 78.

Figure 15:
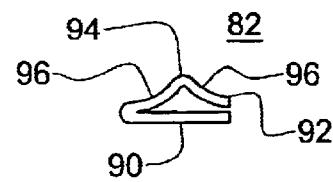
FIG. 15 is an elevational view of a snap spring.
Figure 16:
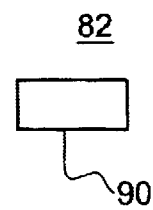
FIG. 16 is a plan view of the snap spring.

FIGS. 15 and 16 show the snap spring 82. The snap spring 82 has a flat portion 90 and a curved portion 92 that is connected to the flat portion 90 and substantially parallel to the flat portion 90. The curved portion has a peak 94 and two slopes 96 on the left and right sides of the peak 94. The two slopes 96 provides the snapping action explained above.

Figure 17:
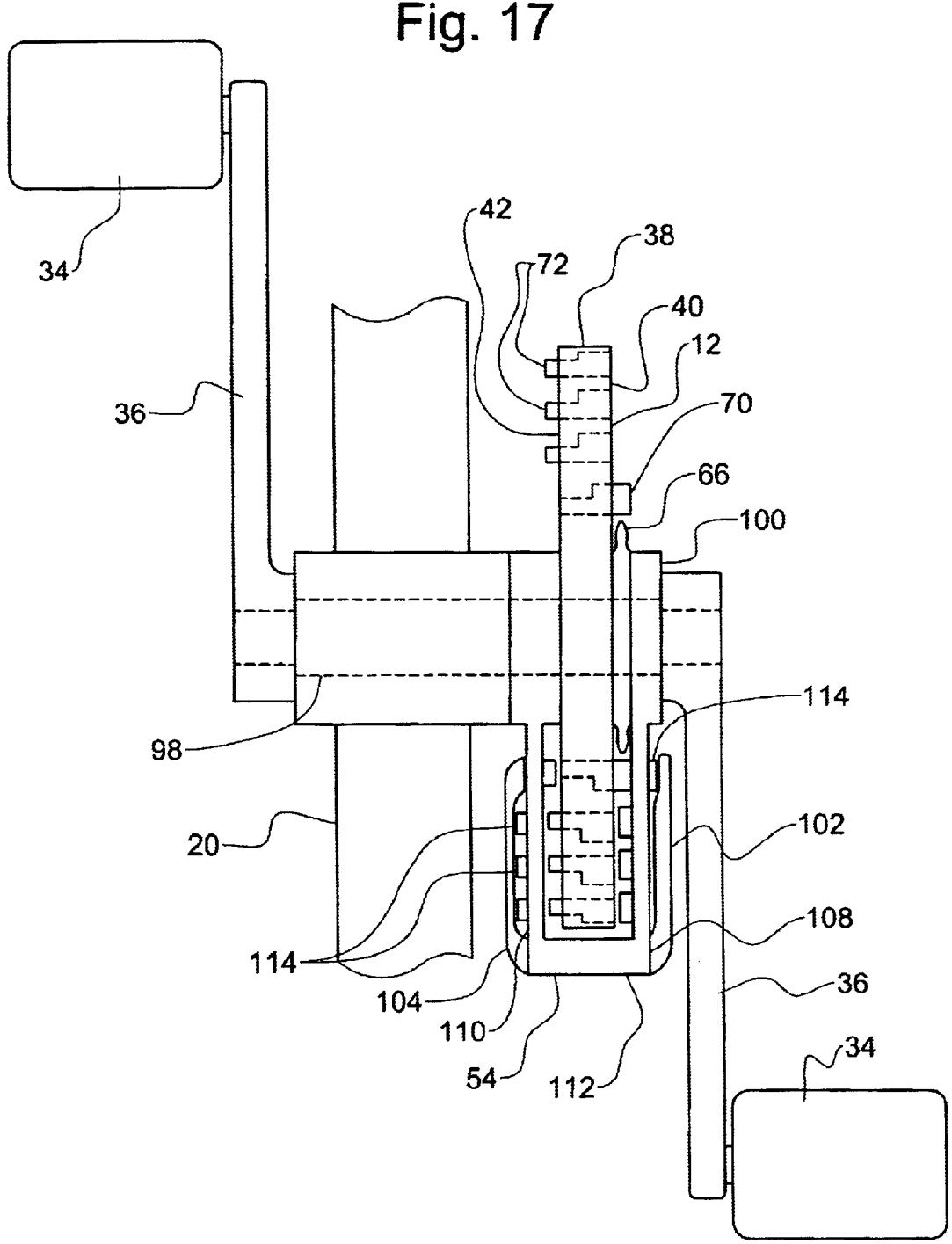
FIG. 17 is a schematic plan view of the disc and a tooth series selector installed on the bicycle.

FIG. 17 shows how the multi-speed gear system 12 is installed on the frame 20 of the bicycle 10. A main shaft 98 is rotationally received in the frame 20. The pedal arms 36 are fixed to the main shaft 98. The disc 38 of the multi-speed gear system 12 is fixed to the main shaft 98, and the tooth series selector 54 of the multi-speed gear system 12 is fixed to the frame 20. When a rider pedals the bicycle 10, the main shaft 98, the pedal arms 36 and the disc 38 rotates integrally.

Figure 18:
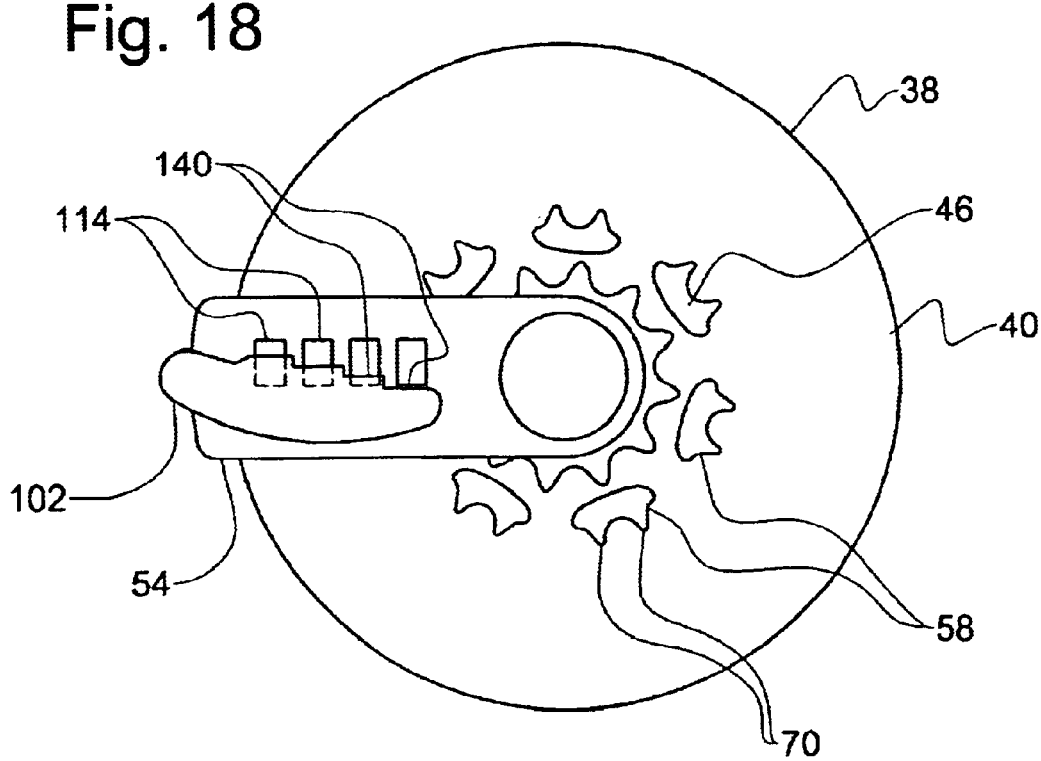
FIG. 18 is a schematic elevational view of the disc and the tooth series selector viewed from the right side of the bicycle.
Figure 19:
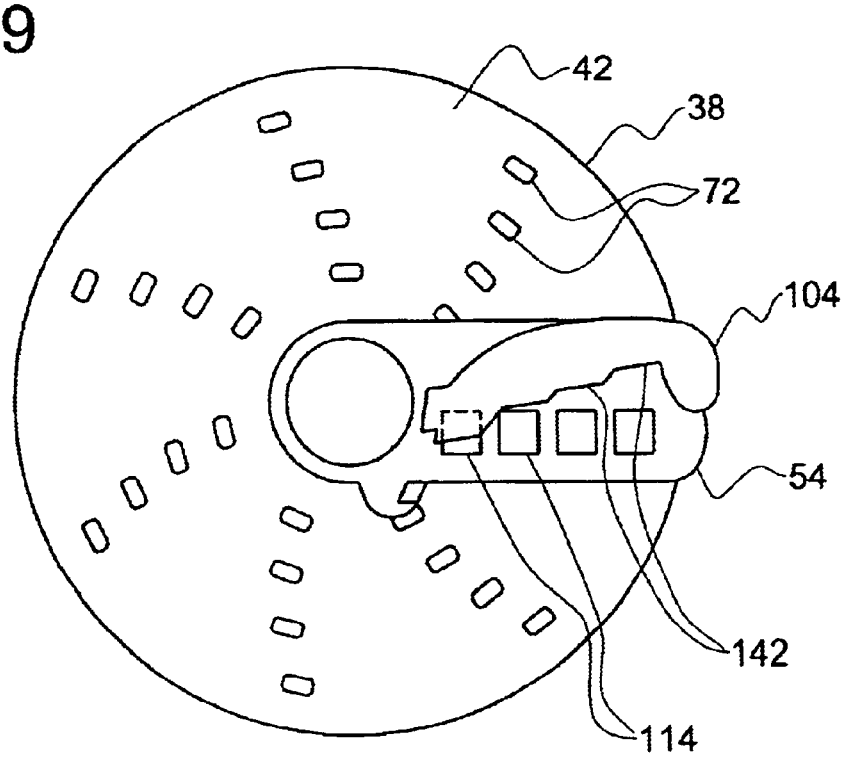
FIG. 19 is a schematic elevational view of the disc and the tooth series selector viewed from the left side of the bicycle.

FIGS. 17 and 18 show that the tooth series selector 54 selected the tooth series 46 and the teeth 70 of the tooth blocks 58 of the tooth series 46 protrudes out of the front plate 40 of the disc 38, while the teeth 70 of the other tooth series 48, 50 and 52 are pushed into the disc 38. FIGS. 17 and 19 show that the projections 72 of the tooth blocks 58 of the tooth series 48, 50 and 52 protrude from the rear plate 42.

Figure 20:
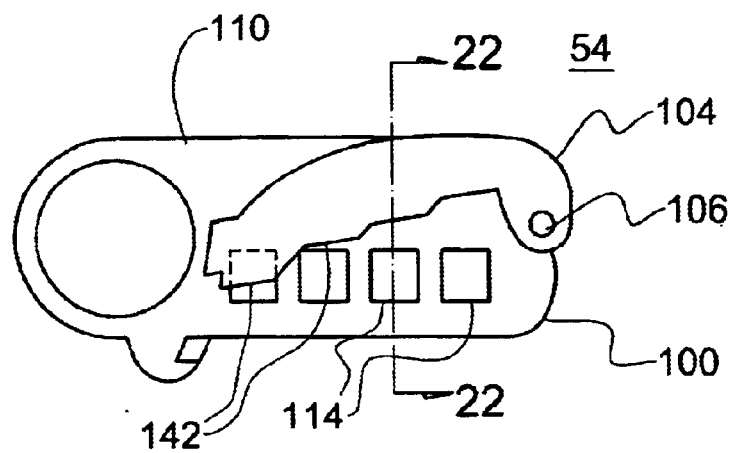
FIG. 20 is a front elevational view of the tooth series selector.
Figure 21:
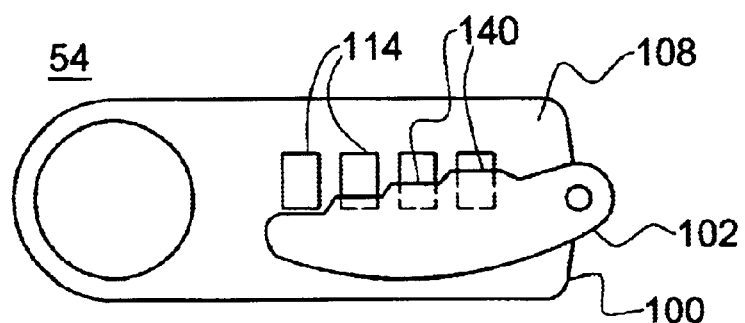
FIG. 21 is a rear elevational view of the tooth series selector.
Figure 22:
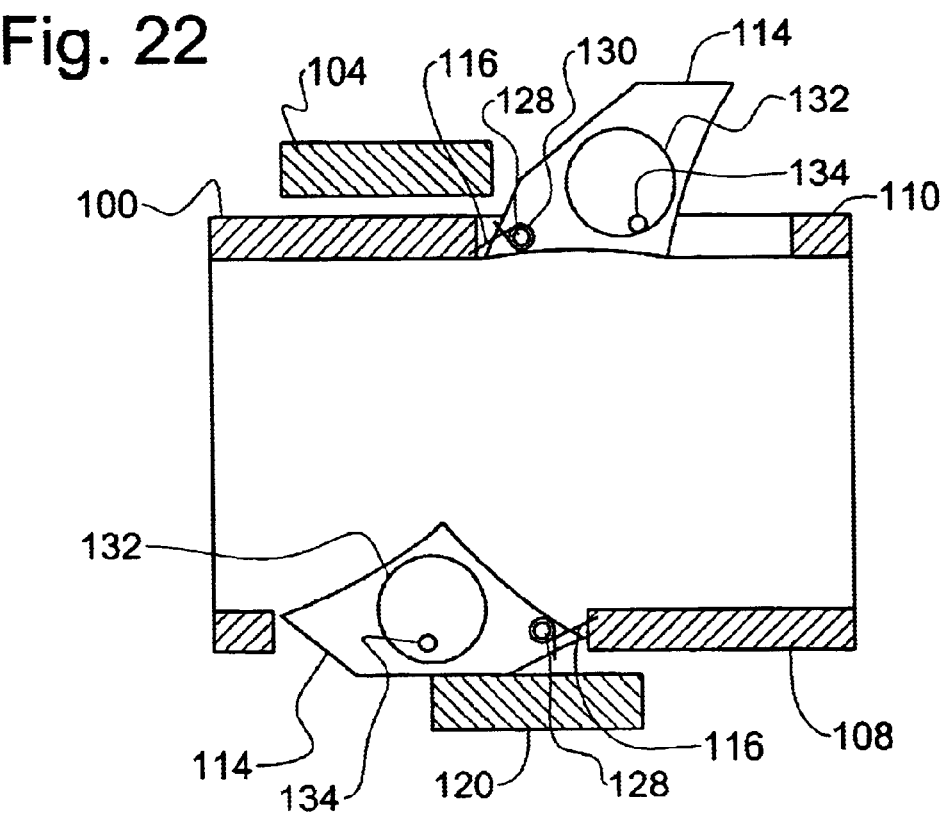
FIG. 22 is a cross-sectional view taken along the line 22—22 in FIG. 20.

FIGS. 20–22 show the tooth series selector 54. The tooth series selector 54 has a U-shaped selector body 100 (also refer to FIG. 17), an upper arm 102, a lower arm 104, and a pin 106 connecting the upper arm 102 and the lower arm 104. The selector body 100 has a top wall 108, a bottom wall 110, and a side wall 112 connecting the top wall 108 and the bottom wall 110. The pin 106 is pivotally attached to the side wall 112. The top wall 108 has a plurality of pivoting blocks 114 and the bottom wall 110 has a plurality of pivoting blocks 114. The pivoting blocks 114 are pivotally received in rectangular apertures 115 provided in the top wall 108 and the bottom wall 110 (refer to FIG. 31). As shown in FIG. 17, the disc 38 rotates between the top wall 108 and the bottom wall 110. As shown in FIG. 22, the pivoting block 114 is biased outside of the tooth series selector 54 by a spring 116.

Referring back to FIG. 17, the upper arm 102 selectively push the pivoting blocks 114 into the space between the top wall 108 and the front plate 40 of the disc 38, and the selected pivoting blocks 114 push the teeth 70 of the tooth blocks 58 of the selected tooth series 44, 46, 48, 50 and 52 into the tooth hole 60 of the front plate 40, and the lower arm 104 selectively push the pivoting blocks 114 into the space between the bottom wall 110 and the rear plate 42 of the disc 38 and the selected pivoting block 114 pushes the projection 72 of the tooth blocks 58 of the selected tooth series into the rear hole 62 of the rear plate 42.

Figure 23:
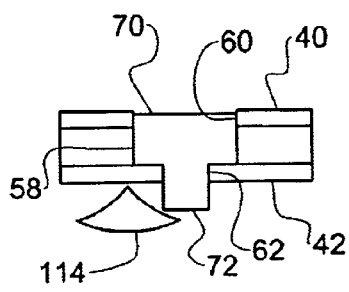
FIG. 23 is a schematic diagram showing that the tooth block is being pushed out of the front plate of the disc by a pivoting block of the tooth series selector when the disc is rotated clockwise viewed from the right side of the bicycle.
Figure 24:
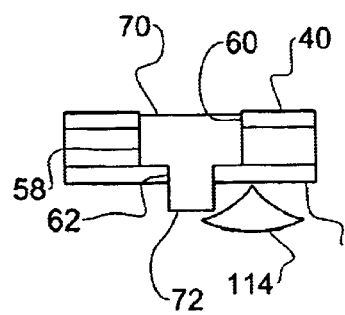
FIG. 24 is a schematic diagram showing that the tooth block is being pushed out of the front plate of the disc by the pivoting block of the tooth series selector when the disc is rotated counterclockwise.
Figure 25:
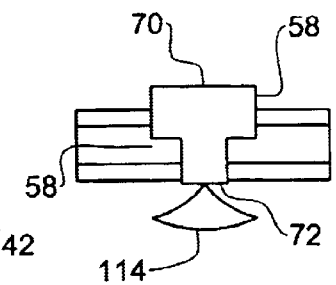
FIG. 25 is a schematic diagram showing that the tooth block is fully pushed out of the front plate of the disc, and the tooth block does not interfere with the pivoting block of the tooth series selector at the rear plate of the disc.
Figure 26:
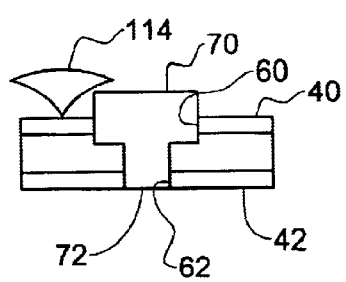
FIG. 26 is a schematic diagram showing that the tooth block is being pushed into the front plate of the disc by the pivoting block of the tooth series selector when the disc is rotated clockwise.
Figure 27:
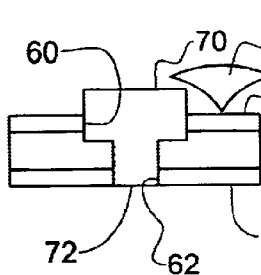
FIG. 27 is a schematic diagram showing that the tooth block is being pushed into the front plate of the disc by the pivoting block of the tooth series selector when the disc is rotated counterclockwise.
Figure 28:
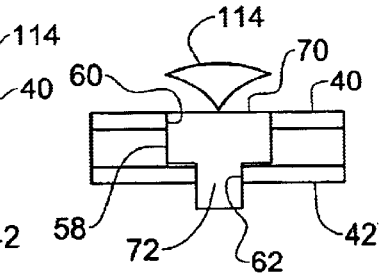
FIG. 28 is a schematic diagram showing that the tooth block is fully pushed into the front plate of the disc, and the tooth block does not interfere with the pivoting block of the tooth series selector at the front plate of the disc.

FIGS. 23–28 show how the pivoting block 114 makes the tooth block 58 change positions between a protruded position and a retracted position. FIG. 23 shows that the pivoting block 114 contacts the projection 72 of the tooth block 58 and is about to push the projection 72 into the rear hole 62 of the rear plate 42. FIG. 26 shows that the pivoting block 114 contacts the tooth 70 of the tooth block 58 and is about to push the teeth 70 into the tooth hole 60 of the front plate 40. FIGS. 23 and 26 show the state that the disc 38 rotates clockwise when viewed from the right side of the bicycle 10. This means that the rear wheel 16 of the bicycle 10 is driven. FIGS. 24 and 27 show a similar state when the disc 38 rotates counterclockwise. The operation of the pivoting block 114, and hence of the tooth series selector 54 is the same for both clockwise and counterclockwise rotations. Therefore, it is possible to shift the multi-speed gear system 12 even when the bicycle 10 is standing still, or when the bicycle 10 is moving by inertia and the disc 38 is rotated counterclockwise. FIG. 25 shows the state that the projection 72 is fully retracted into the disc 38 and the pivoting block 114 does not interfere with the projection 72. FIG. 28 shows that the teeth 70 are fully retracted into the disc 38 and the pivoting block 114 does not interfere with the teeth 70.

Figure 29:
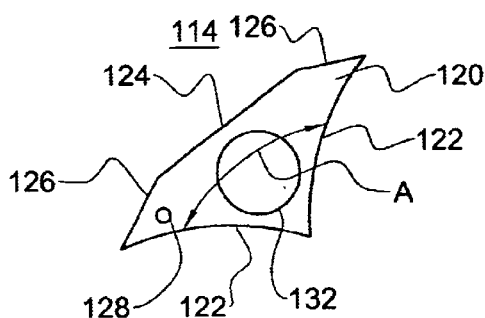
FIG. 29 is an elevational view of the pivoting block of the tooth series selector.
Figure 30:
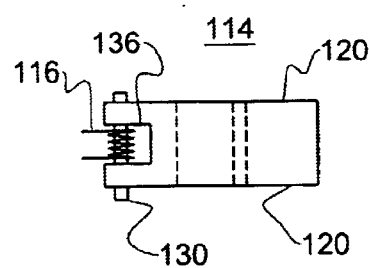
FIG. 30 is a plan view of the pivoting block.

FIGS. 29 and 30 show the pivoting block 114. The pivoting block 114 includes two arc-shaped walls 120, two side walls 122 making a predetermined angle A, a flat wall 124 and two curved walls 126 connecting the flat wall 124 and the two side walls 122. The two side walls 122, the two curved walls 126 and the flat wall 124 connect the two arc-shaped walls 120. The two side walls 122 are symmetrically positioned and the two curved walls 126 are symmetrically positioned. A first through hole 128 is provided between one of the curved walls 126 and one of the side walls 122, and the tooth series selector 54 further has a shaft 130 that is received in the first through hole 128 (refer to FIG. 31). Preferably, the predetermined angle A is in the range between about 110 and about 120 degrees, and the two side walls 122 are concave. The concave shape together with the predetermined angle provides smooth operation when the pivoting block 114 pushes the tooth 70 or the projection 72 of the tooth block 58 into the disc 38.

The pivoting block further includes a second through hole 132, and the tooth series selector 54 further includes a rod 134 received in the second through hole 132 (refer to FIG. 22). The size of the second through hole 132 is substantially larger than the size of the rod 134. The rod 134 limits outward rotation of the pivoting block 114 when the pivoting block 114 is released.

The pivoting block 114 further includes a recess 136 formed in the curved wall 126 and the side wall 122. The spring 116 biasing the pivoting block 114 outward is received in the recess 136 and wound around the shaft 130 of the tooth series selector 54.

Figure 31:
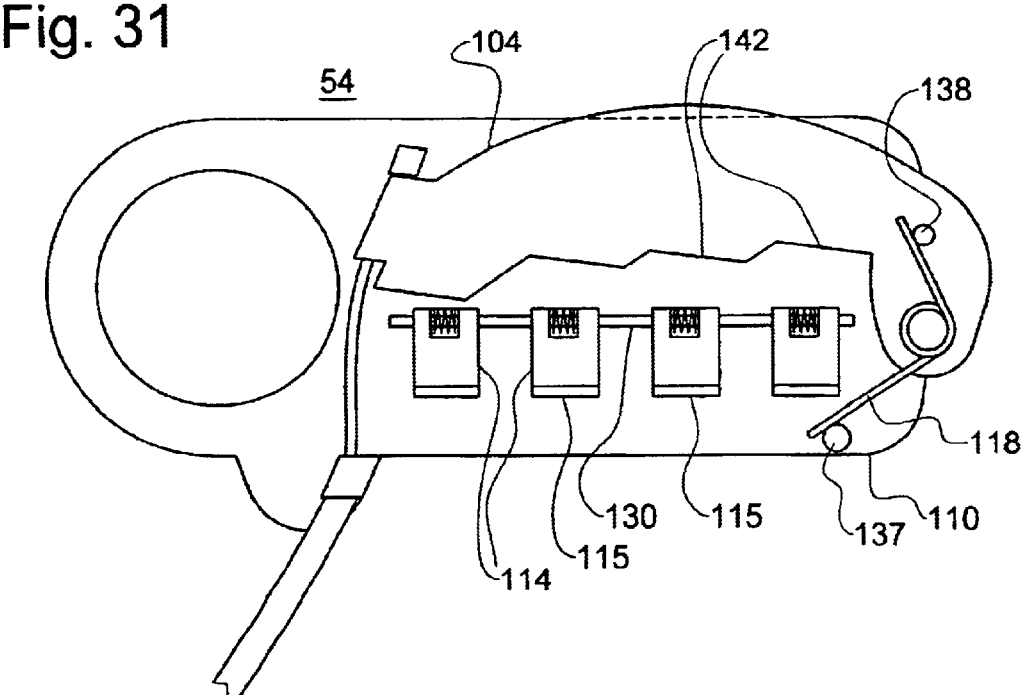
FIG. 31 is a front elevational view of the tooth series selector showing a cable actuating a selecting lever of the tooth series selector.

Referring FIG. 31, the upper arm 102 and the lower arm 104 are biased toward the original position by a return spring 118. The return spring 118 is supported by a first stop 137 provided on the bottom wall 110 and a second stop 138 provided on the lower arm 104. A cable 121 is attached to the lower arm 104. The upper arm 102 and the lower arm 104 are rotated from the original position by pulling the cable 121.

Figure 32:
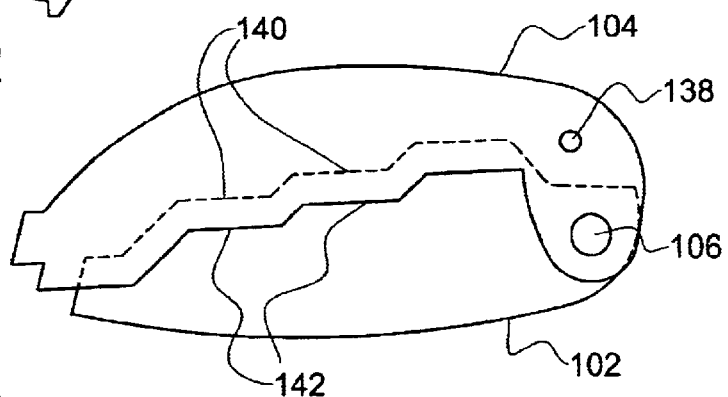
FIG. 32 is a front elevational view of the selecting lever.
Figure 33:
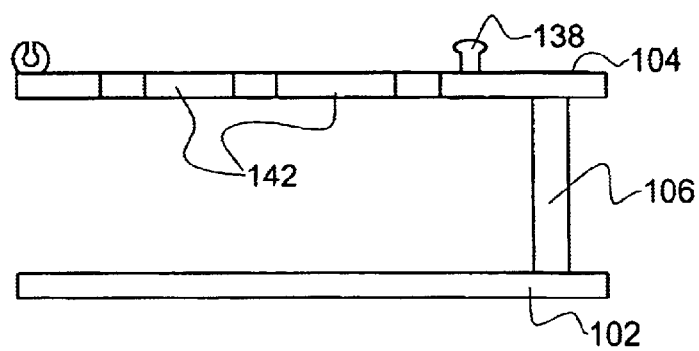
FIG. 33 is a bottom view of the selecting lever.

As shown in FIGS. 32 and 33, the upper arm 102 has steps 140 so that the upper arm 102 pushes all of the pivoting blocks 114 of the top wall 108 at the original position and gradually releases more pivoting blocks 114 starting from the radially innermost pivoting block 114 as the upper arm 102 is rotated further from the original position (Also refer to FIGS. 18 and 21). The lower arm 104 has steps 142 so that the lower arm 104 releases all of the pivoting blocks 114 of the bottom wall 110 at the original position and gradually pushes more pivoting blocks 114 starting from the radially innermost pivoting block 114 as the lower arm 104 is rotated further from the original position (Also refer to FIGS. 19 and 20).

Referring back to FIG. 1, the multi-speed gear system 12 may further comprise a speed selector 144 that is connected to the tooth series selector with the cable 121. A commercially available speed selector for a multi-speed bicycle may be used as the speed selector 144.

With the above construction, the multi-speed gear system of the present invention provides a simple and light speed change mechanism for a chain transmission device that employs a single driving sprocket wheel and a single driven sprocket wheel. Since the chain moves between the tooth series in a single plane, shifting is smooth. In addition, since the mechanism works for both clockwise and counterclockwise rotations of the driving sprocket wheel, the rider can shift while she does not pedal the bicycle forward.

Although the invention has been described in considerable detail, other versions are possible by converting the aforementioned construction. For example, the multi-speed gear system can be used for any chain transmission device that needs multi-speed mechanism. Therefore, the scope of the invention shall not be limited by the specification specified above.

What is claimed is:

1. A multi-speed gear system for a chain transmission device comprising:
   a) a disc having a front plate, a rear plate, and a plurality of tooth series concentrically arranged in the disc;
   b) a tooth series selector;
   wherein the front plate and the rear plate are spaced apart by a predetermined distance, wherein each of the tooth series has a plurality of tooth blocks, wherein the front plate of the disc has a plurality of tooth holes, and the rear plate of the disc has a plurality of rear holes, wherein each of the tooth blocks is either pushed into a corresponding one of the tooth holes or protrudes out of the front plate, wherein the tooth series selector selects one of the tooth series in order to change speed and makes the tooth blocks of the selected tooth series protrude out of the front plate.

2. The multi-speed gear system of claim 1, wherein the tooth series selector makes the tooth blocks of the next radially outward tooth series protrude out of the front plate when the ratio of speed change becomes higher, and the tooth series selector makes the tooth blocks of the next radially inward tooth series be pushed into the tooth holes when the ratio of speed change becomes lower.

3. The multi-speed gear system of claim 2, further comprising a sprocket wheel, wherein the diameter of the sprocket wheel is smaller than the diameter of the radially innermost tooth series.

4. The multi-speed gear system of claim 2, wherein the number of the tooth series is five.

5. The multi-speed gear system of claim 2, wherein the ratio of speed change is in a range between about 1:1 and about 3.2:1.

6. The multi-speed gear system of claim 2, wherein the number of tooth blocks of each tooth series is about seven.

7. The multi-speed gear system of claim 2, wherein the tooth blocks of the tooth series are arranged so that the line connecting the center of one of the tooth blocks of one of the tooth series and the center of the corresponding tooth block of the adjacent tooth series is a curve.

8. The multi-speed gear system of claim 7, wherein the curve is spiral.

9. The multi-speed gear system of claim 2, wherein each of the tooth blocks has a body, two teeth that protrude from the body, a projection that protrudes from the body, a guide portion that protrudes from the body between the teeth and the projection, a recess provided in the projection and the guide portion, a slot provided in the recess, a stop spring and a snap spring, wherein the stop spring and the snap spring are received in the recess, wherein the stop spring protrudes out of the tooth block through the slot, wherein when one of the teeth is pushed, the teeth are pushed into the tooth hole of the front plate of the disc, the snap spring snaps the tooth block in a position in which the teeth are pushed into the disc, the guide portion abuts the rear plate of the disc limiting further movement of the tooth block, and the projection protrudes out of the rear plate of the disc; and wherein when the projection is pushed into the rear hole of the rear plate of the disc, the snap spring snaps the tooth block in a position in which the projection is pushed into the disc, the stop spring abuts the front plate of the disc limiting further movement of the tooth block, the teeth protrude out of the front plate of the disc, and the guide portion contacts the tooth hole.

10. The multi-speed gear system of claim 9, wherein the tooth block further includes a hole in the recess to disassemble the tooth block from the disc.

11. The multi-speed gear system of claim 9, wherein the tooth series selector has a U-shaped selector body, an upper arm, a lower arm, and a pin connecting the upper arm and the lower arm, wherein the selector body has a top wall, a bottom wall, and a side wall connecting the top wall and the bottom wall, wherein the pin is pivotally attached to the side wall, wherein the top wall has a plurality of pivoting blocks and the bottom wall has a plurality of pivoting blocks, wherein the disc rotates between the top wall and the bottom wall, wherein each of the pivoting blocks is biased outside of the tooth series selector by a spring, wherein the upper arm selectively push the pivoting blocks into the space between the top wall and the front plate of the disc and the selected pivoting block pushes the teeth of the tooth blocks of the selected tooth series into the tooth holes of the front plate, and the lower arm selectively push the pivoting blocks into the space between the bottom wall and the rear plate of the disc and the selected pivoting block pushes the projections of the tooth blocks of the selected tooth series into the rear holes of the rear plate.

12. The multi-speed gear system of claim 11, wherein the upper arm and the lower arm are biased toward the original position by a return spring, wherein a cable is attached to the lower arm, wherein the upper arm and the lower arm are rotated from the original position by pulling the cable, wherein the upper arm has steps so that the upper arm pushes all of the pivoting blocks of the top wall at the original position and gradually releases more pivoting blocks starting from the radially innermost pivoting block as the upper arm is rotated further from the original position, and the lower arm has steps so that the lower arm releases all of the pivoting blocks of the bottom wall at the original position and gradually pushes more pivoting blocks starting from the radially innermost pivoting block as the lower arm is rotated further from the original position.

13. The multi-speed gear system of claim 12, further comprising a speed selector that is connected to the tooth series selector with the cable.

14. The multi-speed gear system of claim 11, wherein each of the pivoting blocks includes two arc-shaped walls, two side walls making a predetermined angle, a flat wall and two curved walls connecting the flat wall and the two side walls, wherein the two side walls, the two curved walls and the flat wall connect the two arc-shaped walls, wherein the two side walls are symmetrically positioned and the two curved walls are symmetrically positioned, wherein a first through hole is provided between one of the curved walls and one of the side walls, and wherein the tooth series selector further has a shaft that is received in the first through hole.

15. The multi-speed gear system of claim 14, wherein the predetermined angle is in the range between about 110 and about 120 degrees.

16. The multi-speed gear system of claim 14, wherein the two side walls are concave.

17. The multi-speed gear system of claim 14, wherein each of the pivoting block further includes a second through hole, and the tooth series selector further includes a rod received in the second through hole, wherein the size of the second through hole is substantially larger than the size of the rod, wherein the rod limits outward rotation of the pivoting block when the pivoting block is released.

18. The multi-speed gear system of claim 14, wherein each of the pivoting blocks further includes a recess formed in the curved wall and the side wall, and wherein the spring biasing the pivoting block outward is received in the recess and wound around the shaft of the tooth series selector.

19. The multi-speed gear system of claim 9, wherein the front plate has apertures between the tooth holes and the rear plate has apertures between the rear holes to reduce the weight of the disc.

20. A multi-speed gear system for a chain transmission device for a bicycle, wherein the chain transmission device having a driving sprocket wheel driven by pedals of the bicycle, a driven sprocket wheel attached to a rear wheel of the bicycle, one or more tension sprocket wheels, and a chain wound around the sprocket wheels, comprising:
   a) a disc having a front plate, a rear plate, and a plurality of tooth series concentrically arranged in the disc;
   b) a tooth series selector;
wherein the disc is the driving sprocket wheel, wherein the front plate and the rear plate are spaced apart by a predetermined distance, wherein each of the tooth series has a plurality of tooth blocks, wherein the front plate of the disc has a plurality of tooth holes, and the rear plate of the disc has a plurality of rear holes, wherein each of the tooth blocks is either pushed into a corresponding one of the tooth holes or protrudes out of the front plate, wherein the tooth series selector selects one of the tooth series in order to change speed and makes the tooth blocks of the selected tooth series protrude out of the front plate.

21. The multi-speed gear system of claim 20, wherein the tooth series selector makes the tooth blocks of the next radially outward tooth series protrude out of the front plate when the ratio of speed change becomes higher, and the tooth series selector makes the tooth blocks of the next radially inward tooth series be pushed into the tooth holes when the ratio of speed change becomes lower.

22. The multi-speed gear system of claim 21, wherein each of the tooth blocks has a body, two teeth that protrude from the body, a projection that protrudes from the body, a guide portion that protrudes from the body between the teeth and the projection, a recess provided in the projection and the guide portion, a slot provided in the recess, a stop spring and a snap spring, wherein the stop spring and the snap spring are received in the recess, wherein the stop spring protrudes out of the tooth block through the slot, wherein when one of the teeth is pushed, the teeth are pushed into the tooth hole of the front plate of the disc, the snap spring snaps the tooth block in a position in which the teeth are pushed into the disc, the guide portion abuts the rear plate of the disc limiting further movement of the tooth block, and the projection protrudes out of the rear plate of the disc; and wherein when the projection is pushed into the rear hole of the rear plate of the disc, the snap spring snaps the tooth block in a position in which the projection is pushed into the disc, the stop spring abuts the front plate of the disc limiting further movement of the tooth block, the teeth protrude out of the front plate of the disc, and the guide portion contacts the tooth hole.

23. The multi-speed gear system of claim 22, wherein the tooth series selector has a U-shaped selector body, an upper arm, a lower arm, and a pin connecting the upper arm and the lower arm, wherein the selector body has a top wall, a bottom wall, and a side wall connecting the top wall and the bottom wall, wherein the pin is pivotally attached to the side wall, wherein the top wall has a plurality of pivoting blocks and the bottom wall has a plurality of pivoting blocks, wherein the disc rotates between the top wall and the bottom wall, wherein each of the pivoting blocks is biased outside of the tooth series selector by a spring, wherein the upper arm selectively push the pivoting blocks into the space between the top wall and the front plate of the disc and the selected pivoting block pushes the teeth of the tooth blocks of the selected tooth series into the tooth holes of the front plate, and the lower arm selectively push the pivoting blocks into the space between the bottom wall and the rear plate of the disc and the selected pivoting block pushes the projections of the tooth blocks of the selected tooth series into the rear holes of the rear plate.

24. The multi-speed gear system of claim 23, wherein the upper arm and the lower arm are biased toward the original position by a return spring, wherein a cable is attached to the lower arm, wherein the upper arm and the lower arm are rotated from the original position by pulling the cable, wherein the upper arm has steps so that the upper arm pushes all of the pivoting blocks of the top wall at the original position and gradually releases more pivoting blocks starting from the radially innermost pivoting block as the upper arm is rotated further from the original position, and the lower arm has steps so that the lower arm releases all of the pivoting blocks of the bottom wall at the original position and gradually pushes more pivoting blocks starting from the radially innermost pivoting block as the lower arm is rotated further from the original position.

25. The multi-speed gear system of claim 24, further comprising a speed selector that is connected to the tooth series selector with the cable.

26. The multi-speed gear system of claim 23, wherein each of the pivoting blocks includes two arc-shaped walls, two side walls making a predetermined angle, a flat wall and two curved walls connecting the flat wall and the two side walls, wherein the two side walls, the two curved walls and the flat wall connect the two arc-shaped walls, wherein the two side walls are symmetrically positioned and the two curved walls are symmetrically positioned, wherein a first through hole is provided between one of the curved walls and one of the side walls, and wherein the tooth series selector further has a shaft that is received in the first through hole.

* * * * *